United States Patent
Trachewsky (10) Patent No.: US 7,593,475 B2
(45) Date of Patent: Sep. 22, 2009

(54) SPACE-TIME AND/OR SPACE-FREQUENCY BLOCK CODING USING COMPLEX SIGNAL SWAPPING

(75) Inventor: Jason A. Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 677 days.

(21) Appl. No.: 11/231,576

(22) Filed: Sep. 21, 2005

(65) Prior Publication Data

US 2007/0002962 A1 Jan. 4, 2007

Related U.S. Application Data

(60) Provisional application No. 60/695,153, filed on Jun. 29, 2005.

(51) Int. Cl.
*H04L 1/02* (2006.01)

(52) U.S. Cl. .................. 375/267; 375/260; 375/347; 375/295; 375/299; 375/340; 375/341; 375/346; 375/262; 371/43.6; 371/43.7; 371/43.8; 371/43.11; 370/208; 370/334; 370/339; 455/132; 455/401; 455/103; 455/102

(58) Field of Classification Search .............. 375/267, 375/260, 347, 295, 299, 340, 341, 346, 262; 371/43.6, 43.7, 43.8, 43.11; 370/334, 339, 370/208; 455/132, 401, 103, 102
See application file for complete search history.

(56) References Cited

U.S. PATENT DOCUMENTS 6,185,258 B1 2/2001 Alamouti et al.
6,594,473 B1 7/2003 Dabak et al.
2003/0095533 A1* 5/2003 Joo et al. .................. 370/343
2004/0257978 A1* 12/2004 Shao et al. ................ 370/208
2005/0281350 A1* 12/2005 Chae et al. ................ 375/267
2007/0109028 A1* 5/2007 Craninckx ................ 327/113

OTHER PUBLICATIONS

Kurt T. et al; "Space-Time Coding and Signal Space Diversity in the Presence of Channel Estimation Errors"; CCECE 2004-CCGEI 2004, Niagara Falls.
Taejin Jung et al; "Design of Catenated Space-Time Block Codes Using Signal Space Diversity and the Alamouti Scheme":Proceedings 2003 IEEE International Symposium on Information Theory—Japan.

* cited by examiner

*Primary Examiner*—Shuwang Liu
*Assistant Examiner*—Helene Tayong
(74) *Attorney, Agent, or Firm*—Garlick Harrison & Markison; Bruce E. Stuckman (57) ABSTRACT

A method of space-time and/or space-frequency block encoding begins by receiving at least two complex signals, wherein each of the at least two complex signals includes a real component and an imaginary component. The method continues, for each of the at least two complex signals, by generating a swapped complex signal, wherein each of at least two swapped complex signals includes a swapped real component and a swapped imaginary component, wherein the swapped real component corresponds to the imaginary component and wherein the swapped imaginary component corresponds to the real component. The method continues by encoding the at least two complex signals and the at least two swapped complex signals to produce space-time and/or space-frequency block encoded signals.

15 Claims, 9 Drawing Sheets

SPACE-TIME AND/OR SPACE-FREQUENCY BLOCK CODING USING COMPLEX SIGNAL SWAPPING

This patent application is claiming priority under 35 USC § 119 to a provisionally filed patent application entitled SPACE-TIME AND/OR SPACE-FREQUENCY BLOCK CODING USING COMPLEX SIGNAL SWAPPING, having a provisional filing date of Jun. 29, 2005, and a provisional Ser. No. of 60/695,153.

BACKGROUND OF THE INVENTION

1. Technical Field of the Invention

This invention relates generally to encoded communications and more particularly to space-time and/or space-frequency block encoding.

2. Description of Related Art

Communication systems are known to support wireless and wireline communications between wireless and/or wireline communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many systems, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to capture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial, frequency, or time encoding function to produce two or more streams of data. The transmitter includes multiple transmission paths to convert each stream of data into multiple RF signals. The receiver receives the multiple RF signals via multiple receiver paths that capture the streams of data utilizing a spatial, frequency, or time decoding function. The captured streams of data are combined and subsequently processed to recover the original data.

In many instances of a MIMO or MISO communications, the receiver has fewer antennas than the transmitter. To accommodate for this difference, the transmitter, and receiver, include a space-time block coding or a space-frequency block coding scheme. One such space-time or space-frequency block coding technique is disclosed in U.S. Pat.

No. 6,185,258 issued to Alamouti, et al. In general, the Alamouti, et al. patent teaches a simple block coding arrangement where symbols are transmitted over a plurality of transmit channels and the coding comprises only of simple arithmetic operations, e.g., negation and conjugation. While the block coding taught by Alamouti et al. provides a block coding arrangement, alternative techniques for block coding are desirable.

Therefore, a need exists for a method and apparatus of space-time and/or space-frequency block coding using complex signal swapping.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
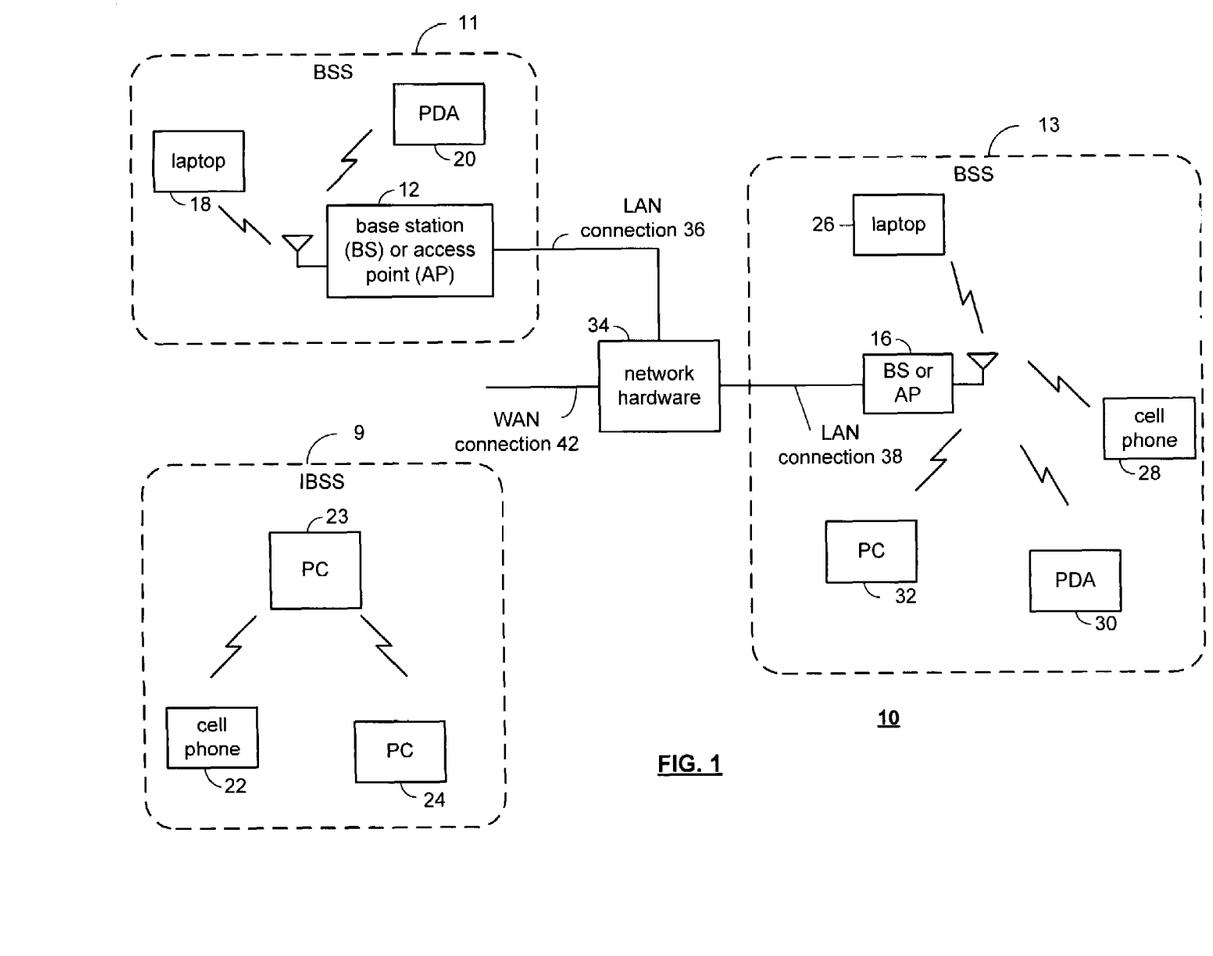
FIG. 1 is a schematic block diagram of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, and/or any other type of radio frequency based network protocol). Regardless of the particular type of communication system, each wireless communication device includes a built-in radio and/or is coupled to a radio.

Figure 2:
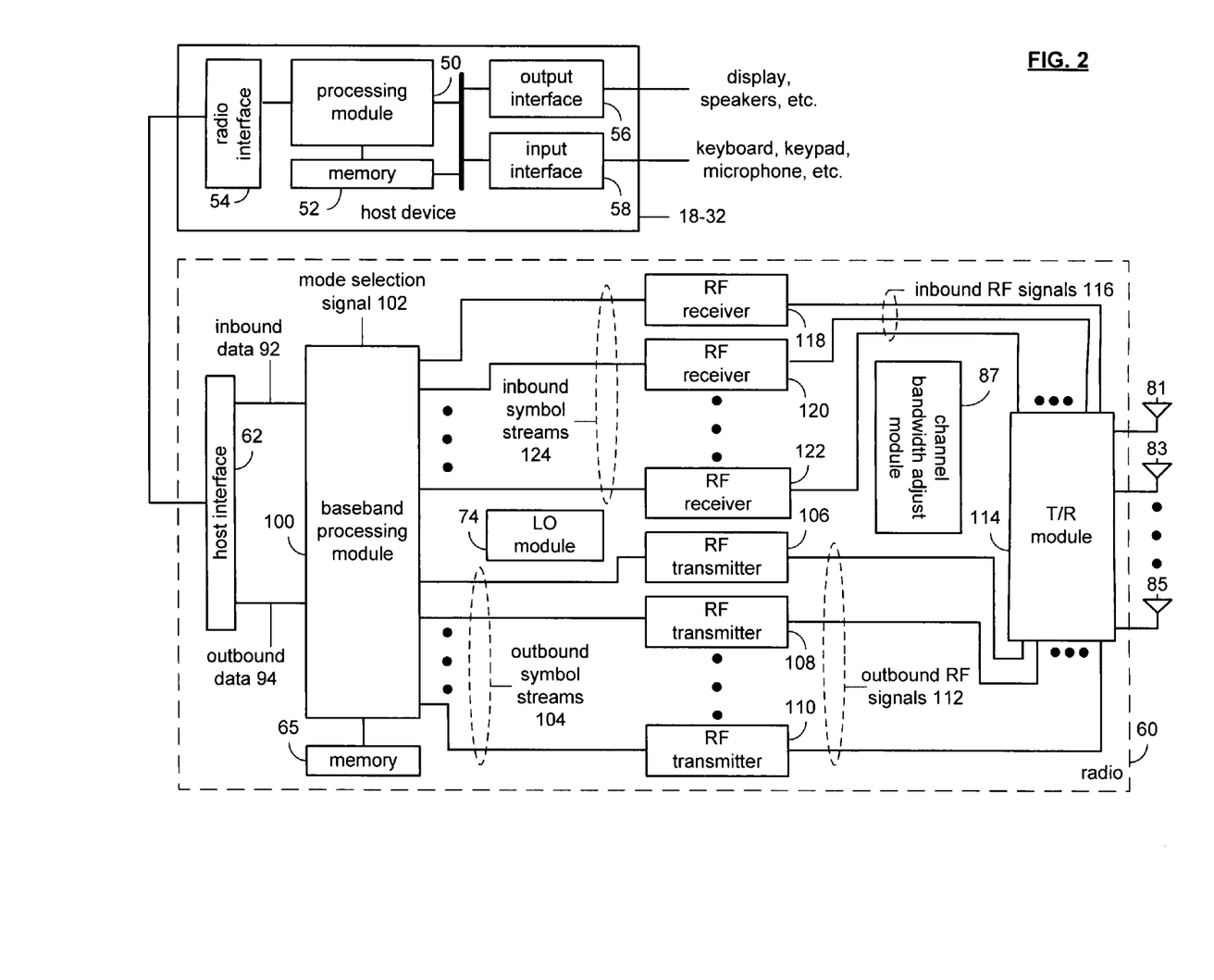
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, a channel bandwidth adjust module 87, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing modules 100 may be implemented using one or more processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 64 receives the outbound data 88 and, based on a mode selection signal 102, produces one or more outbound symbol streams 90. The mode selection signal 102 will indicate a particular mode of operation that is compliant with one or more specific modes of the various IEEE 802.11 standards. For example, the mode selection signal 102 may indicate a frequency band of 2.4 GHz, a channel separation of 20 or 25 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode select signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode select signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode select signal 102 indicates 2, 3 or 4 antennas, the baseband processing module 100 will produce 2, 3 or 4 outbound symbol streams 104 from the outbound data 94.

Depending on the number of outbound streams 104 produced by the baseband module 10, a corresponding number of the RF transmitters 106-110 will be enabled to convert the outbound symbol streams 104 into outbound RF signals 112. In general, each of the RF transmitters 106-110 includes a digital filter and upsampling module, a digital to analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122, based on settings provided by the channel bandwidth adjust module 87, converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 2 may be implemented using one or more integrated circuits. For example, the host device may be implemented on one integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 3:
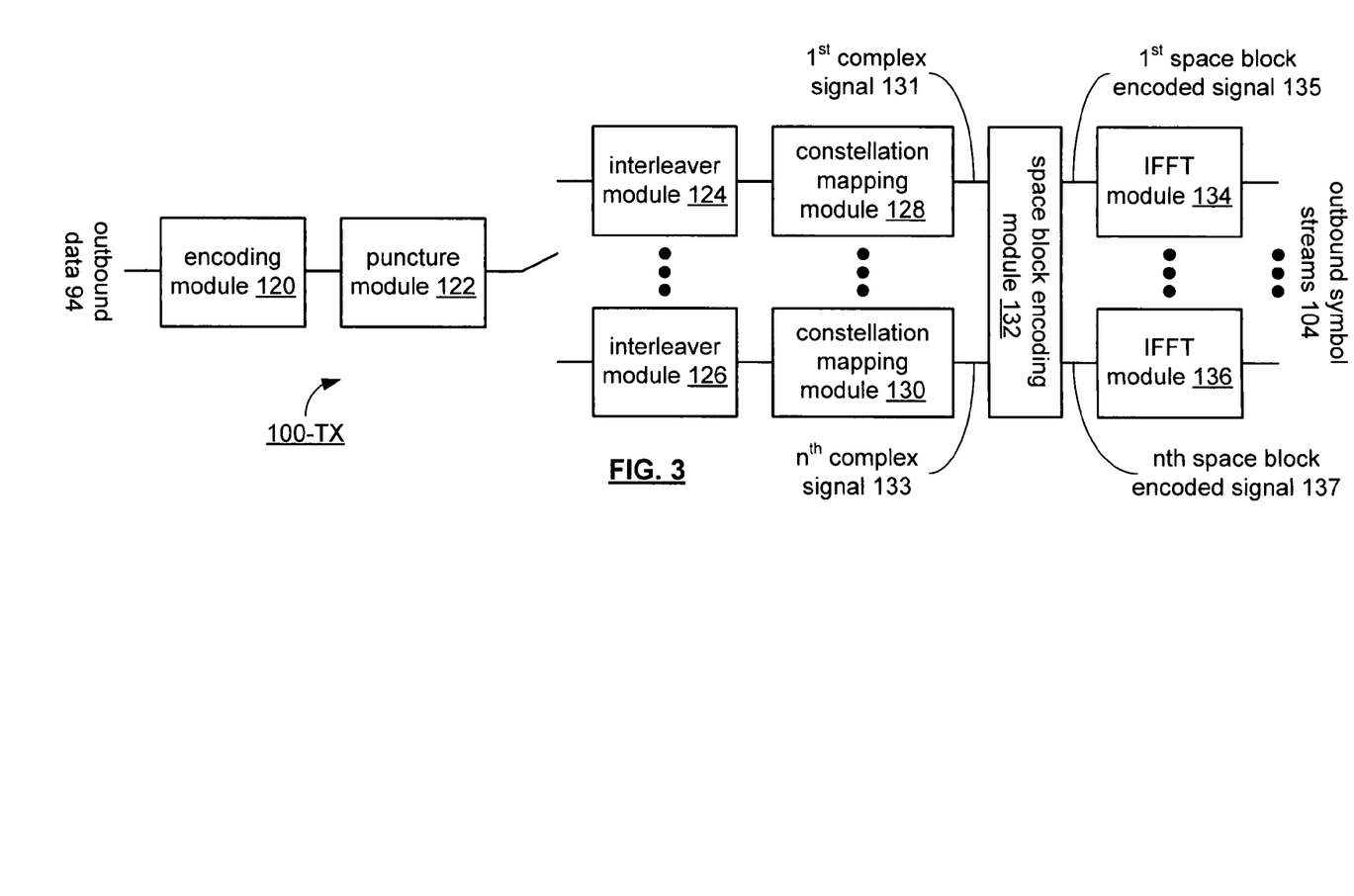
FIG. 3 is a schematic block diagram of a transmit baseband processing module in accordance with the present invention.

FIG. 3 is a functional schematic block diagram of baseband transmit processing 100-TX within the baseband processing module 100, which includes an encoding module 120, a puncture module 122, a switch, an interleaving module, which may include a plurality of interleaver modules 124, 126 or an interleaver and a switching module, a plurality of constellation encoding modules 128, 130, a space-time and/or space-frequency block encoding module 132, and a plurality of inverse fast Fourier transform (IFFT) modules 134, 136 for converting the outbound data 94 into the outbound symbol stream 104. As one of ordinary skill in the art will appreciate, the baseband transmit processing may include two or more of each of the interleaver modules 124, 126, the constellation mapping modules 128, 130, and the IFFT modules 134, 136 depending on the number of transmit paths. In addition, one of ordinary skill in art will further appreciate that the encoding module 122, puncture module 122, the interleaver modules 124, 126, the constellation mapping modules 128, 130, and the IFFT modules 134, 136 may be function in accordance with one or more wireless communication standards including, but not limited to, IEEE 802.11a, b, g, n.

In one embodiment, the encoding module 120 is operably coupled to convert outbound data 94 into encoded data in accordance with one or more wireless communication standards. The puncture module 122 punctures the encoded data to produce punctured encoded data. The plurality of interleaver modules 124, 126 is operably coupled to interleave the punctured encoded data into a plurality of interleaved streams of data. The plurality of constellation mapping modules 128, 130 is operably coupled to map the plurality of interleaved streams of data into a plurality of streams of data symbols, wherein each data symbol of the stream of data symbols includes one or more complex signal. The space-time and/or space-frequency block encoding module 132, which will be described in greater detail with reference to FIGS. 4-8, is operably coupled to encode a plurality of complex signals 131, 133 (e.g., at least two complex signals) into a plurality of space-time and/or space-frequency block encoded signals 135, 137. The plurality of IFFT modules 124, 136 is operably coupled to convert the plurality of space-time and/or space-frequency block encoded signals 135, 137 into a plurality of outbound symbol streams 104.

Figure 4:
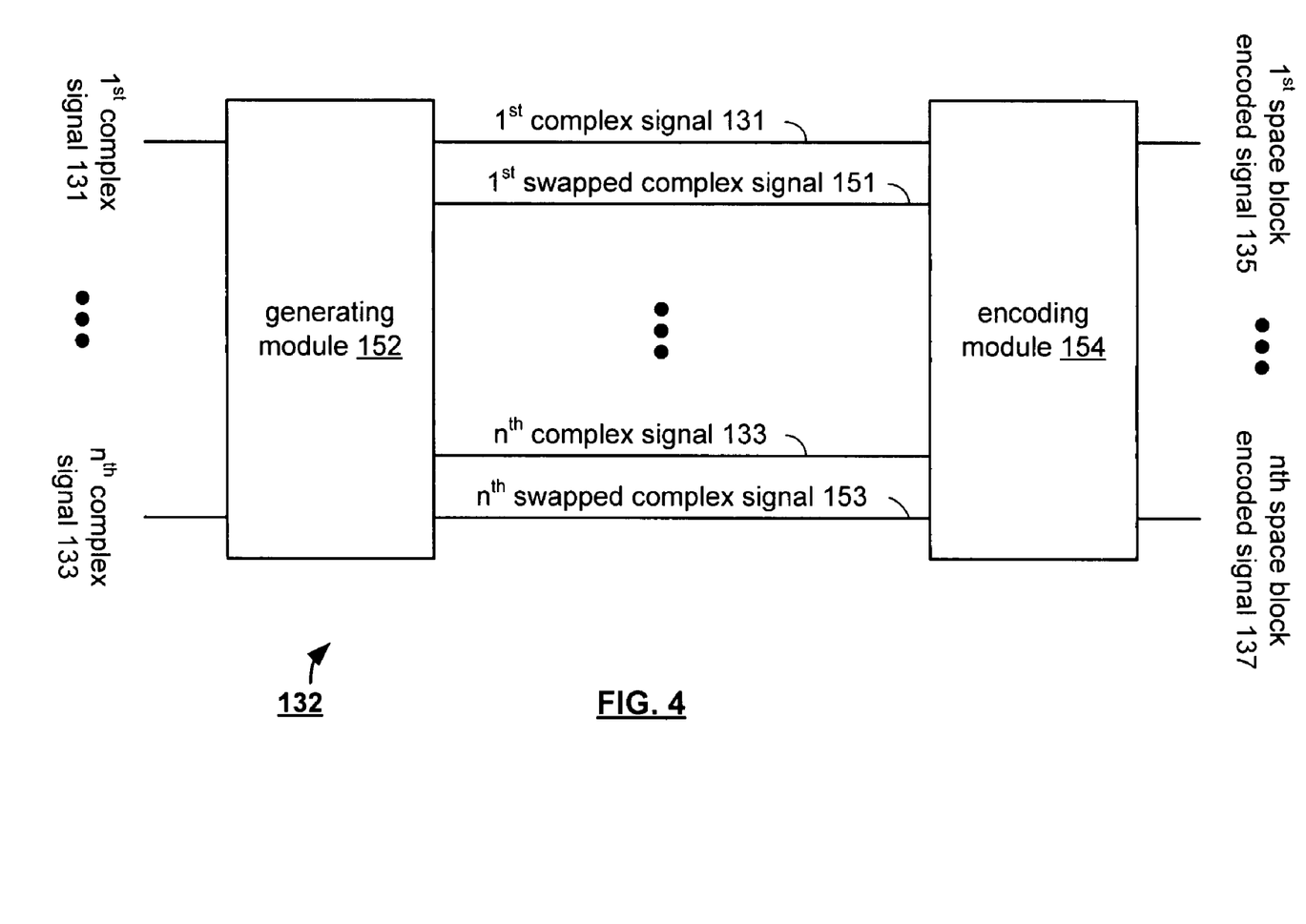
FIG. 4 is a schematic block diagram of a space-time and/or space-frequency block encoding module in accordance with the present invention.

FIG. 4 is a schematic block diagram of the space-time and/or space-frequency block encoding module 132, which includes a generating module 152 and an encoding module 154. The generating module 152 is operably coupled to receive at least two complex signals 131, 133, where each of the at least two complex signals includes a real component and an imaginary component. For instance, a first complex signal ($S_0$) may be represented as $S_0 = S_{0i} + \sqrt{-1} \cdot S_{0q}$, where "i" denotes an in-phase component, "q" denotes a quadrature component, $S_{0i}$ represents the real component of the first complex signal and $S_{0q}$ represents the imaginary component of the first complex signal and a second complex signal ($S_1$) may be represented as $S_1 = S_{1i} + \sqrt{-1} \cdot S_{1q}$, where "i" denotes the in-phase component, "q" denotes the quadrature component, $S_{1i}$ represents an in-phase component of the first complex signal and $S_{1q}$ represents a quadrature component of the second complex signal.

Upon receiving the complex signals, the generating module generates a swapped complex signal for each of the complex signals, where each of the swapped complex signals includes a swapped real component and a swapped imaginary component, wherein the swapped real component corresponds to the imaginary component and wherein the swapped imaginary component corresponds to the real component. For instance, a first swapped complex signal ($\sigma S_0$) may be represented as $\sigma(S_0) = S_{0q} + \sqrt{-1} \cdot S_{0i}$, where "i" denotes the in-phase component, "q" denotes the quadrature component, $S_{0q}$ represents the swapped real component of the first swapped complex signal and $S_{0q}$ represents the swapped imaginary component of the first swapped complex signal and a second swapped complex signal ($\sigma S_1$) may be represented as $\sigma(S_1) = S_{1q} + \sqrt{-1} \cdot S_{1i}$, where "i" denotes the in-phase component, "q" denotes the quadrature component, $S_{1q}$ represents the swapped real component of the second swapped complex signal and $S_{1i}$ represents the swapped imaginary component of the second swapped complex signal.

The encoding module 154 is operably coupled to encode the complex signals 131, 133 and the swapped complex signals 151, 153 to produce space-time and/or space-frequency block encoded signals 135, 137. In one embodiment, the encoding module 154 encodes the complex signals and the swapped complex signals over time to produce space-time block encoded signals. In another embodiment, the encoding module 154 encodes the complex signals and the swapped complex signals over frequency to produce space-frequency block encoded signals.

Figure 5A:
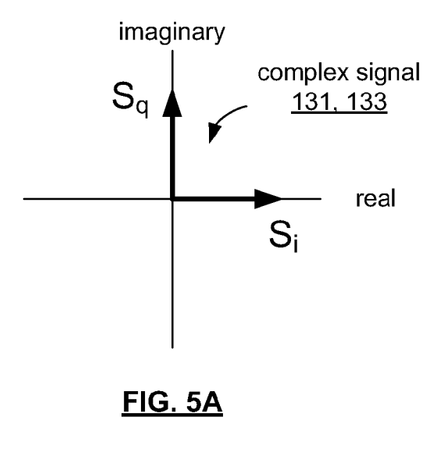
FIGS. 5A, 5C are diagrams of complex signals and swapped complex signals in accordance with the present invention.
Figure 5B:
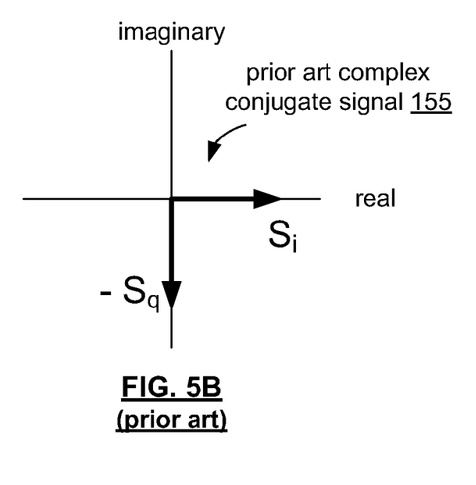
FIG. 5B is a diagram of a complex conjugate signal of the prior art.
Figure 5C:
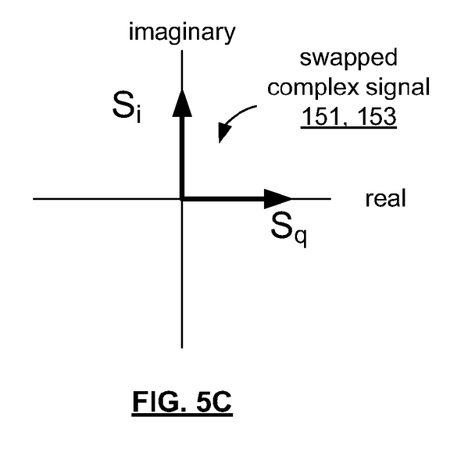

FIGS. 5A-5C are diagrams of a complex signal 131, 133, a prior art complex conjugate signal, and a swapped complex signal 151, 153, respectively. In accordance with various embodiments of the space-time and/or space-frequency block encoding module 132, the encoding may be done as space-time block encoding using the complex signals and the swapped complex signals and/or done as space-frequency block encoding using the complex signals and the swapped complex signals without the need to create complex conjugate signals.

Figure 6:
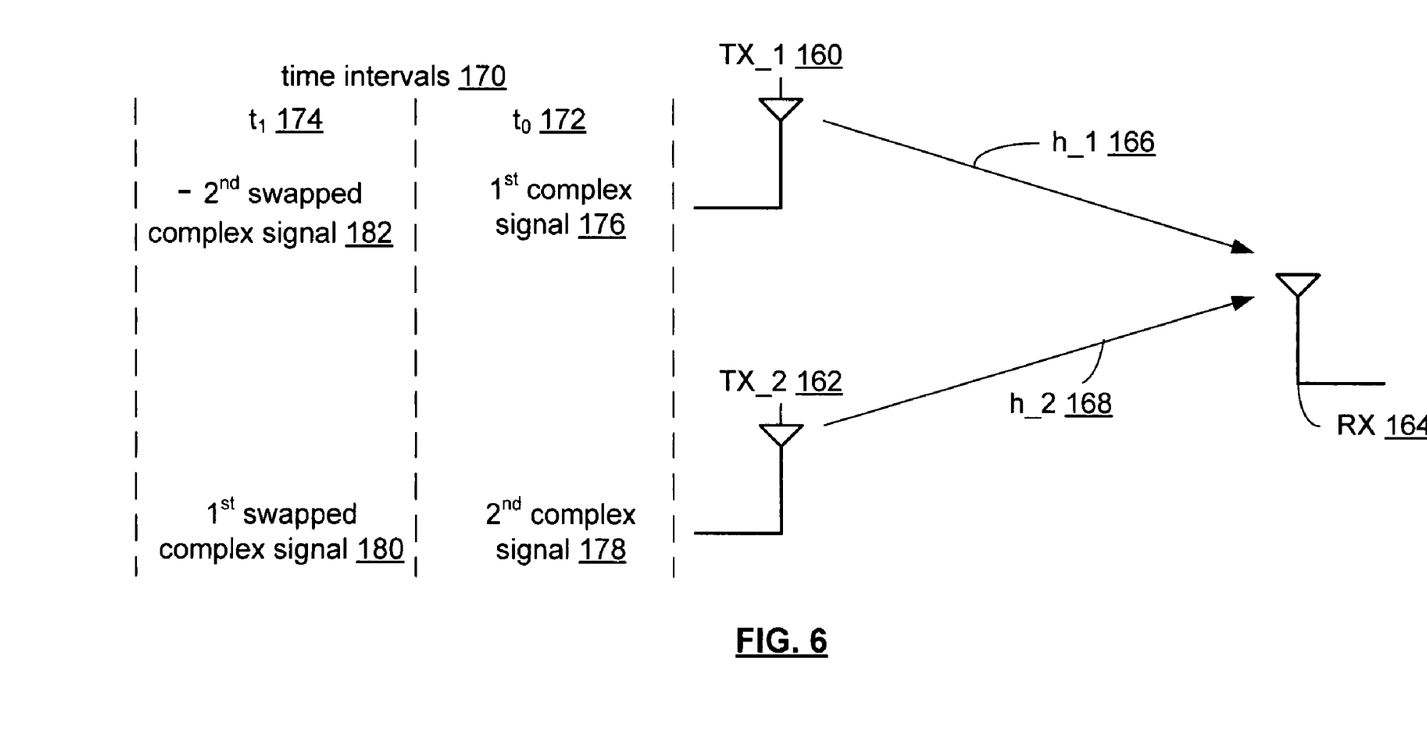
FIG. 6 is a diagram of an example of space-time and/or space-frequency block encoding in accordance with the present invention.

FIG. 6 is a diagram illustrating a space-time block encoding between two transmit antennas TX_1 and TX_2 160, 162 (i.e., two transmit paths) and a single receive antenna RX 164. The two channel paths are represented by h_1 166 and h_2 168. Since there are two transmit paths and only one receive path, the transmit paths in this example are space-time block encoded (STBC) over time intervals 170. For instance, for a first time interval $t_0$ 172, the STBC places a first complex signal 176 ($S_0$) on a first transmit path and a second complex signal 178 ($S_1$) on the second transmit path. During a second time interval $t_1$ 174, the STBC places a negation of a second swapped complex signal 182 ($-\sigma S_1$) on the first transmit path and a first swapped complex signal 180 ($\sigma S_0$) on the second transmit path. Thus, signals received (y) by the RX antenna 164 may be expressed as $y(t_0) = h\_1 \times S_0 + h\_2 \times S_1$ and $y(t_1) = h\_1 \times (-\sigma S_1) + h\_2 \times (\sigma S_0)$.

Figure 7:
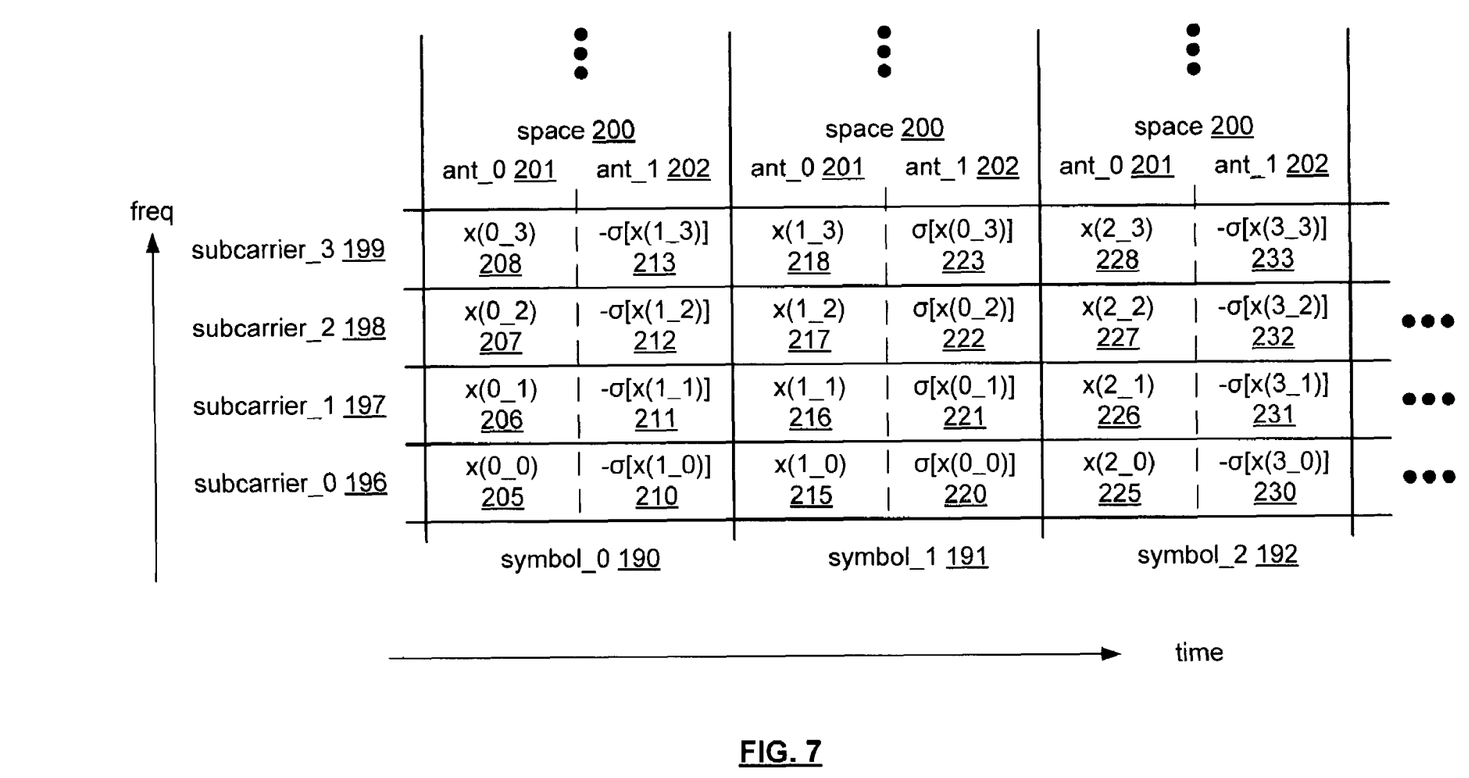
FIG. 7 is a diagram of an example of space-time block encoding of an OFDM signal in accordance with the present invention.

FIG. 7 is a diagram illustrating space-time block encoding of an orthogonal frequency division multiplex (OFDM) transmission. In general, the space-time block encoding for an OFDM transmission places a first complex signal, which corresponds to a first constellation point on subcarrier k of the OFD) transmission, on a first transmit antenna path during a first time interval. The space-time block encoding further places a second complex signal, which corresponds to a second constellation point on subcarrier k+1 of the OFDM transmission, the first transmit antenna path during a second time interval. The space-time block encoding further places a negative representation of a second swapped complex signal on subcarrier k for a second transmit antenna path during the first time interval. The space-time block encoding further places a first swapped complex signal on subcarrier k+1 for the second transmit antenna path during the second time interval.

In the particular example of FIG. 7, a symbol includes a plurality of complex signals [x] and the number of complex signals per symbol corresponds to the number of data carrying subcarriers (k) of an OFDM transmission. In this example, x(0_0) 205 represents the $0^{th}$ complex signal of symbol_0 190, x(0_1) 206 represents the $1^{st}$ complex signal of symbol_0 190, x(0_2) 207 represents the $2^{nd}$ complex signal of symbol_0 190, and x(0_3) 208 represents the $3^{rd}$ complex signal of symbol_1 190; x(1_0) 215 represents the $0^{th}$ complex signal of symbol_1 191, x(1_1) 216 represents the $1^{st}$ complex signal of symbol_1 191, x(1_2) 217 represents the $2^{nd}$ complex signal of symbol_0 191, and x(1_3) 218 represents the $3^{rd}$ complex signal of symbol_1 191; x(2_0) 225 represents the $0^{th}$ complex signal of symbol_2 192, x(2_1) 226 represents the $1^{st}$ complex signal of symbol_2 192, x(2_2) 227 represents the $2^{nd}$ complex signal of symbol_2 192, and x(2_3) 228 represents the $3^{rd}$ complex signal of symbol_2 192. Further, $\sigma[x(0\_0)]$ 220 represents the $0^{th}$ swapped complex signal of symbol_0 190, $\sigma[x(0\_1)]$ 221 represents the $1^{st}$ swapped complex signal of symbol_0 190, $\sigma[x(0\_2)]$ 222 represents the $2^{nd}$ swapped complex signal of symbol_0 190, $\sigma[x(0\_3)]$ 223 represents the $3^{rd}$ swapped complex signal of symbol_0 190; $\sigma[x(1\_0)]$ 210 represents the $0^{th}$ swapped complex signal of symbol_1 191, $\sigma[x(1\_1)]$ 211 represents the $1^{st}$ swapped complex signal of symbol_1 191, $\sigma[x(1\_2)]$ 212 represents the $2^{nd}$ swapped complex signal of symbol_1 191, $\sigma[x(1\_3)]$ 213 represents the $3^{rd}$ swapped complex signal of symbol_1 191; $\sigma[x(3\_0)]$ 230 represents the $0^{th}$ swapped complex signal of symbol_3, σ[x(3_1)] 231 represents the $1^{st}$ swapped complex signal of symbol_3, σ[x(3_2)] 232 represents the $2^{nd}$ swapped complex signal of symbol_3, σ[x(3_3)] 233 represents the $3^{rd}$ swapped complex signal of symbol_3.

As shown, the space-time block encoding is over time between the zeroth and first symbols 190 and 191, the second 192 and third symbols, etc. The space component 200 of the space-time block encoding is introduced by the number of transmit paths (i.e., antennas). In this example, there are two transmit antennas [ant_0 201 and ant_1 202]. For space-time block encoding of an OFDM transmission, each data subcarrier_n 196-199 carriers the corresponding complex signal or swapped complex signal. For instance, subcarrier_0 196 on antenna zero 201 carriers x(0_0) for a first time interval, subcarrier_0 196 on antenna one 202 carriers −σ[x(1_0)] for the first time interval, subcarrier_0 196 on antenna zero 201 carriers x(1_0) for a second time interval, and subcarrier_0 196 on antenna one 202 carriers σ[x(0_0)] for the second time interval. Similarly, subcarrier_1 197 on antenna zero 201 carriers x(0_1) for a first time interval, subcarrier_1 197 on antenna one 202 carriers −σ[x(1_1)] for the first time interval, subcarrier_1 197 on antenna zero 201 carriers x(1_1) for a second time interval, and subcarrier_1 197 on antenna one 202 carriers σ[x(0_1)] for the second time interval.

Figure 8:
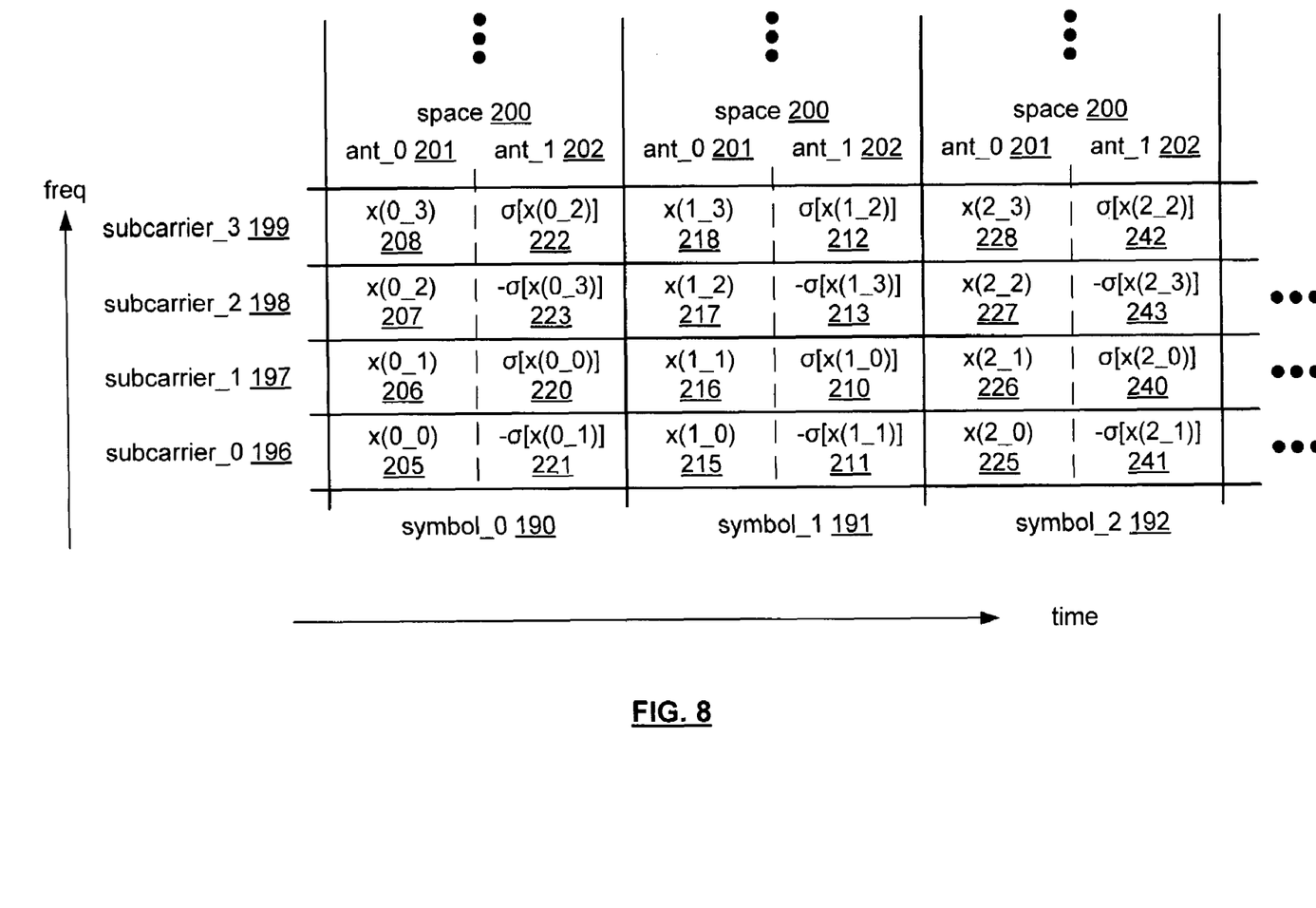
FIG. 8 is a diagram of an example of space-frequency block encoding of an OFDM signal in accordance with the present invention.

FIG. 8 is a diagram illustrating space-frequency block encoding of an orthogonal frequency division multiplex (OFDM) transmission. In general, the space-frequency block encoding for an OFDM transmission places a first complex signal, which corresponds to a first constellation point on subcarrier k of an orthogonal frequency division multiplex (OFDM) transmission, for a first transmit antenna path during a first time interval. The space-frequency block encoding for an OFDM transmission places a second complex signal, which corresponds to a second constellation point on the subcarrier k of the OFDM transmission, on a second transmit antenna path during the first time interval. The space-frequency block encoding for an OFDM transmission places a negative representation of a second swapped complex signal on subcarrier k+1 for the first transmit antenna path during a second time interval. The space-frequency block encoding for an OFDM transmission places a first swapped complex signal on subcarrier k+1 for the second transmit antenna at the second time interval.

In the particular example of FIG. 8, a symbol includes a plurality of complex signals [x] and the number of complex signals per symbol corresponds to the number of data carrying subcarriers (k) of an OFDM transmission. In this example, x(0_0) 205 represents the $0^{th}$ complex signal of symbol_0 190, x(0_1) 206 represents the $1^{st}$ complex signal of symbol_0 190, x(0_2) 207 represents the $2^{nd}$ complex signal of symbol_0 190, and x(0_3) 208 represents the $3^{rd}$ complex signal of symbol_1 190; x(1_0) 215 represents the $0^{th}$ complex signal of symbol_1 191, x(1_1) 216 represents the $1^{st}$ complex signal of symbol_1 191, x(1_2) 217 represents the $2^{nd}$ complex signal of symbol_0 191, and x(1_3) 218 represents the $3^{rd}$ complex signal of symbol_1 191; x(2_0) 225 represents the $0^{th}$ complex signal of symbol_2 192, x(2_1) 226 represents the $1^{st}$ complex signal of symbol_2 192, x(2_2) 227 represents the $2^{nd}$ complex signal of symbol_2 192, and x(2_3) 228 represents the $3^{rd}$ complex signal of symbol_2 192. Further, σ[x(0_0)] 220 represents the $0^{th}$ swapped complex signal of symbol_0 190, σ[x(0_1)] 221 represents the $1^{st}$ swapped complex signal of symbol_0 190, σ[x(0_2)] 222 represents the $2^{nd}$ swapped complex signal of symbol_0 190, σ[x(0_3)] 223 represents the $3^{rd}$ swapped complex signal of symbol_0 190; σ[x(1_0)] 210 represents the $0^{th}$ swapped complex signal of symbol_1 191, σ[x(1_1)] 211 represents the $1^{st}$ swapped complex signal of symbol_1 191, σ[x(1_2)] 212 represents the $2^{nd}$ swapped complex signal of symbol_1 191, σ[x(1_3)] 213 represents the $3^{rd}$ swapped complex signal of symbol_1 191; σ[x(2_0)] 240 represents the $0^{th}$ swapped complex signal of symbol_2 192, σ[x(2_1)] 241 represents the $1^{st}$ swapped complex signal of symbol_2 192, σ[x(2_2)] 242 represents the $2^{nd}$ swapped complex signal of symbol_2 192, σ[x(2_3)] 243 represents the $3^{rd}$ swapped complex signal of symbol_2 192.

As shown, the space-frequency block encoding is over frequency between the zeroth and first subcarriers 196 and 197, the second and third subcarriers 198, 199, etc. The space component 200 of the space-frequency block encoding is introduced by the number of transmit paths (i.e., antennas). In this example, there are two transmit antennas [ant_0 201 and ant_1 202]. For space-frequency block encoding of an OFDM transmission, each symbol 190-192 supports the corresponding complex signal or swapped complex signal. For instance, symbol_0 190 on antenna zero 201 supports x(0_0) for a first time interval on subcarrier_0 196, symbol_0 190 on antenna one 202 supports −σ[x(0_1)] for the first time interval on subcarrier_0 196, symbol_0 190 on antenna zero 201 supports x(0_1) for the first time interval on subcarrier_1 197, and symbol_0 190 on antenna one 202 supports σ[x(0_0)] for the first time interval on subcarrier_1 197. Similarly, symbol_1 191 on antenna zero 201 supports x(1_0) for a second time interval on subcarrier_0 196, symbol_1 191 on antenna one 202 supports −σ[x(1_1)] for the second time interval on subcarrier_0 196, symbol_1 191 on antenna zero 201 supports x(1_1) for the second time interval on subcarrier_1 197, and symbol_1 191 on antenna one 202 supports σ[x(1_0)] for the second time interval on subcarrier_1 197.

Figure 9:
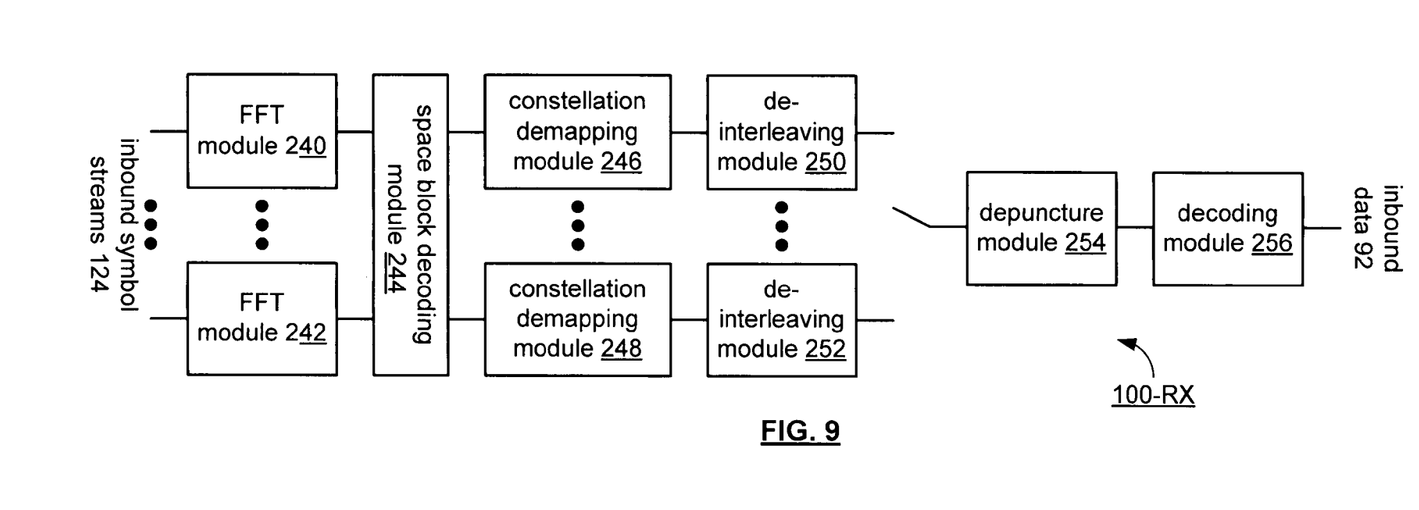
FIG. 9 is a schematic block diagram of a receive baseband processing module in accordance with the present invention.

FIG. 9 is a schematic block diagram of baseband receive processing 100-RX that includes a plurality of fast Fourier transform (FFT) modules 240, 242, a space-time and/or space-frequency block decoding module 244, a plurality of constellation demapping modules 246, 248, a plurality of deinterleaving modules 250, 252, a switch, a depuncture module 254, and a decoding module 256 for converting a plurality of inbound symbol streams 124 into inbound data 92. As one of ordinary skill in the art will appreciate, the baseband receive processing 100-RX may include two or more of each of the deinterleaving modules 250, 252, the constellation demapping modules 246, 248, and the FFT modules 240, 242. In addition, one of ordinary skill in art will further appreciate that the decoding module 256, depuncture module 254, the deinterleaving modules 250, 252, the constellation decoding modules 246, 248, and the FFT modules 240, 242 may be function in accordance with one or more wireless communication standards including, but not limited to, IEEE 802.11a, b, g, n.

In one embodiment, a plurality of FFT modules 240, 242 is operably coupled to convert a plurality of inbound symbol streams 124 into a plurality of streams of space-time and/or space-frequency block encoded symbols. The space-time and/or space-frequency block decoding module 244 is operably coupled to decode the plurality of streams of space-time and/or space-frequency block encoded symbols into a plurality of streams of data symbols. The plurality of constellation demapping modules is operably coupled to demap the plurality of streams of data symbols into a plurality of interleaved streams of data. The plurality of deinterleaving modules is operably coupled to deinterleave the plurality of interleaved streams of data into encoded data. The decoding module is operably coupled to convert the encoded data into inbound data 92. In one embodiment, the space-time and/or space-frequency block decoding module 244 performs an inverse function of the space-time and/or space-frequency block coding module 132 of FIG. 3.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for space-time and/or space-frequency block encoding using swapped complex signals. As one of ordinary skill in the art will appreciate, other embodiments may be derived from the teachings of the present invention without deviating from the scope of the claims.

What is claimed is:

1. A method of encoding, the method comprises:
receiving at least two complex signals, wherein each of the at least two complex signals includes a real component and an imaginary component;
for each of the at least two complex signals, generating a swapped complex signal to include a swapped real component and a swapped imaginary component, wherein the swapped real component corresponds to the imaginary component and wherein the swapped imaginary component corresponds to the real component; and
encoding the at least two complex signals and the at least two swapped complex signals to produce encoded signals;
wherein a first complex signal ($S_0$) of the at least two complex signals being represented as $S_0 = S_{0i} + \sqrt{-1} \cdot S_{0q}$, where "i" denotes an in-phase component, "q" denotes a quadrature component, $S_{0i}$ represents the real component of the first complex signal and $S_{0q}$ represents the imaginary component of the first complex signal;
wherein a second complex signal ($S_1$) of the at least two complex signals being represented as $S_1 = S_{1i} + \sqrt{-1} \cdot S_{1q}$, where "i", where "i" denotes the in-phase component, "q" denotes the quadrature component, $S_{1i}$ represents an in-phase component of the first complex signal and $S_{1q}$ represents a quadrature component of the second complex signal;
wherein a first swapped complex signal $\sigma(S_0)$ of the at least two swapped complex signals being represented as $\sigma(S_0) = S_{0q} + \sqrt{-1} \cdot S_{0i}$, where "i" denotes the in-phase component, "q" denotes the quadrature component, $S_{0q}$ represents the swapped real component of the first swapped complex signal and $S_{0q}$ represents the swapped imaginary component of the first swapped complex signal; and
wherein a second swapped complex signal $\sigma(S_1)$ of the at least two complex signals being represented as $\sigma(S_1) = S_{1q} + \sqrt{-1} \cdot S_{1i}$, where "i" denotes the in-phase component, "q" denotes the quadrature component $S_{1q}$ represents the swapped real component of the second swapped complex signal and $S_{1i}$ represents the swapped imaginary component of the second swapped complex signal.

2. The method of claim 1, wherein the encoding the at least two complex signals and the at least two swapped complex signals further comprises:
encoding the at least two complex signals and the at least two swapped complex signals over time to produce space-time block encoded signals.

3. The method of claim 1, wherein the encoding the at least two complex signals and the at least two swapped complex signals further comprises:
encoding the at least two complex signals and the at least two swapped complex signals over frequency to produce space-frequency block encoded signals.

4. The method of claim 1 comprises:
the first complex signal corresponding to a first constellation point on subcarrier k of an orthogonal frequency division multiplex (OFDM) transmission for a first transmit antenna at a time interval;
the second complex signal corresponding to a second constellation point on the subcarrier K+1 of the OFDM transmission for the first transmit antenna at the time interval;
a negative representation of the second swapped complex signal on subcarrier k for a second transmit antenna at the time interval; and
the first swapped complex signal on subcarrier k+1 for the second transmit antenna at the time interval.

5. The method of claim 1 comprises:
the first complex signal corresponding to a first constellation point on subcarrier k of an orthogonal frequency division multiplex (OFDM) transmission for a first transmit antenna at a time interval;
the second complex signal corresponding to a second constellation point on the subcarrier k of the OFDM transmission for a second transmit antenna at the time interval;
a negative representation of the second swapped complex signal on subcarrier k+1 for the first transmit antenna at the time interval; and
the first swapped complex signal on subcarrier k+1 for the second transmit antenna at the time interval.

6. A baseband transmit processing module comprises:
an encoding module operably coupled to encode outbound data to produce encoded data;
an interleaving module operably coupled to interleave the encoded data into a plurality of interleaved encoded data streams;
a plurality of symbol mapping modules operably coupled to map the plurality of interleaved encoded data streams into a plurality of streams of symbols;
a domain transform modules operably coupled to convert the plurality of streams of symbols from a frequency domain to a time domain to produce a plurality of streams of time domain symbols; and a block encoding module operably coupled to:

receive at least two complex signals from at least two of the plurality of streams of time domain symbols, wherein each of the at least two complex signals includes a real component and an imaginary component and wherein a first one of the at least two complex signals is from a first one of the at least two of the plurality of streams of time domain symbols and a second one of the at least two complex signals is from a second one of the at least two of the plurality of time domain symbols;

for each of the at least two complex signals, generate a swapped complex signal, wherein each of at least two swapped complex signals includes a swapped real component and a swapped imaginary component, wherein the swapped real component corresponds to the imaginary component and wherein the swapped imaginary component corresponds to the real component; and encode the at least two complex signals and the at least two swapped complex signals to produce block encoded signals;

wherein a first complex signal ($S_0$) of the at least two complex signals being represented as $S_0 = S_{0i} + \sqrt{-1} \cdot S_{0q}$, where "i" denotes an in-phase component, "q" denotes a quadrature component, $S_{0i}$ represents the real component of the first complex signal and $S_{0q}$ represents the imaginary component of the first complex signal;

wherein a second complex signal ($S_1$) of the at least two complex signals being represented as $S_1 = S_{1i} + \sqrt{-1} \cdot S_{1q}$, where "i", where "i" denotes the in-phase component, "q" denotes the quadrature component, $S_{1i}$ represents an in-phase component of the first complex signal and $S_{1q}$ represents a quadrature component of the second complex signal;

wherein a first swapped complex signal $\sigma(S_0)$ of the at least two swapped complex signals being represented as $\sigma(S_0) = S_{0q} + \sqrt{-1} \cdot S_{0i}$, where "i" denotes the in-phase component, "q" denotes the quadrature component, $S_{0q}$ represents the swapped real component of the first swapped complex signal and $S_{0q}$ represents the swapped imaginary component of the first swapped complex signal; and wherein a second swapped complex signal $\sigma(S_1)$ of the at least two complex signals being represented as $\sigma(S_0) = S_{0q} + \sqrt{-1} \cdot S_{0i}$, where "i" denotes the in-phase component, "q" denotes the quadrature component $S_{1q}$ represents the swapped real component of the second swapped complex signal and $S_{0q}$ represents the swapped imaginary component of the second swapped complex signal.

7. The baseband transmit processing module of claim 6, wherein the block encoding module encodes the at least two complex signals and the at least two swapped complex signals by:

encoding the at least two complex signals and the at least two swapped complex signals over time to produce space-time block encoded signals.

8. The baseband transmit processing module of claim 6, wherein the block encoding module encodes the at least two complex signals and the at least two swapped complex signals by:

encoding the at least two complex signals and the at least two swapped complex signals over frequency to produce space-frequency block encoded signals.

9. The baseband transmit processing module of claim 6 comprises:

the first complex signal corresponding to a first constellation point on subcarrier k of an orthogonal frequency division multiplex (OFDM) transmission for a first transmit antenna at a time interval;

the second complex signal corresponding to a second constellation point on the subcarrier K+1 of the OFDM transmission for the first transmit antenna at the time interval;

a negative representation of the second swapped complex signal on subcarrier k for a second transmit antenna at the time interval; and the first swapped complex signal on subcarrier k+1 for the second transmit antenna at the time interval.

10. The baseband transmit processing module of claim 6 comprises:

the first complex signal corresponding to a first constellation point on subcarrier k of an orthogonal frequency division multiplex (OFDM) transmission for a first transmit antenna at a time interval;

the second complex signal corresponding to a second constellation point on the subcarrier k of the OFDM transmission for a second transmit antenna at the time interval;

a negative representation of the second swapped complex signal on subcarrier k+1 for the first transmit antenna at the time interval; and the first swapped complex signal on subcarrier k+1 for the second transmit antenna at the time interval.

11. A block encoding module comprises:

a generating module operably coupled to, for each of at least two complex signals, generate a swapped complex signal, wherein each of the at least two complex signals includes a real component and an imaginary component, wherein each of at least two swapped complex signals includes a swapped real component and a swapped imaginary component, wherein the swapped real component corresponds to the imaginary component and wherein the swapped imaginary component corresponds to the real component; and an encoding module operably coupled to encode the at least two complex signals and the at least two swapped complex signals to produce block encoded signals;

wherein a first complex signal ($S_0$) of the at least two complex signals being represented as $S_0 = S_{0i} + \sqrt{-1} \cdot S_{0q}$, where "i" denotes an in-phase component, "q" denotes a quadrature component, $S_{0i}$ represents the real component of the first complex signal and $S_{0q}$ represents the imaginary component of the first complex signal;

wherein a second complex signal ($S_1$) of the at least two complex signals being represented as $S_1 = S_{1i} + \sqrt{-1} \cdot S_{1q}$, where "i", where "i" denotes the in-phase component, "q" denotes the quadrature component, $S_{1i}$ represents an in-phase component of the first complex signal and $S_{1q}$ represents a quadrature component of the second complex signal;

wherein a first swapped complex signal $\sigma(S_0)$ of the at least two swapped complex signals being represented as $\sigma(S_0) = S_{0q} + \sqrt{-1} \cdot S_{0i}$, where "i" denotes the in-phase component, "q" denotes the quadrature component, $S_{0q}$ represents the swapped real component of the first swapped complex signal and $S_{0q}$ represents the swapped imaginary component of the first swapped complex signal; and wherein a second swapped complex signal $\sigma(S_1)$ of the at least two complex signals being represented as $\sigma(S_1) = S_{0q} + \sqrt{-1} \cdot S_{0i}$, where "i" denotes the in-phase component, "q" denotes the quadrature component $S_{1q}$ represents the swapped real component of the second swapped complex signal and $S_{0q}$ represents the swapped imaginary component of the second swapped complex signal.

12. The block encoding module of claim 11, wherein the encoding module further functions to encode the at least two complex signals and the at least two swapped complex signals by:

encoding the at least two complex signals and the at least two swapped complex signals over time to produce space-time block encoded signals.

13. The block encoding module of claim 11, wherein the encoding module further functions to encode the at least two complex signals and the at least two swapped complex signals:

encoding the at least two complex signals and the at least two swapped complex signals over frequency to produce space-frequency block encoded signals.

14. The block encoding module of claim 11 comprises:

the first complex signal corresponding to a first constellation point on subcarrier k of an orthogonal frequency division multiplex (OFDM) transmission for a first transmit antenna at a time interval;

the second complex signal corresponding to a second constellation point on the subcarrier K+1 of the OFDM transmission for the first transmit antenna at the time interval;

a negative representation of the second swapped complex signal on subcarrier k for a second transmit antenna at the time interval; and the first swapped complex signal on subcarrier k+1 for the second transmit antenna at the time interval.

15. The block encoding module of claim 11 comprises:

the first complex signal corresponding to a first constellation point on subcarrier k of an orthogonal frequency division multiplex (OFDM) transmission for a first transmit antenna at a time interval;

the second complex signal corresponding to a second constellation point on the subcarrier k of the OFDM transmission for a second transmit antenna at the time interval;

a negative representation of the second swapped complex signal on subcarrier k+1 for the first transmit antenna at the time interval; and the first swapped complex signal on subcarrier k+1 for the second transmit antenna at the time interval.

* * * * *

UNITED STATES PATENT AND TRADEMARK OFFICE
CERTIFICATE OF CORRECTION

PATENT NO. : 7,593,475 B2  Page 1 of 1
APPLICATION NO. : 11/231576
DATED : September 22, 2009
INVENTOR(S) : Jason A. Trachewsky It is certified that error appears in the above-identified patent and that said Letters Patent is hereby corrected as shown below:

Column 12, line 12, in Claim 1: after "component" insert a --,--.

Column 13, line 50, in Claim 6: after "component" insert a --,--.

Column 13, line 52, in Claim 6: the "$S_{0q}$" should be replaced with --$S_{1q}$--.

Column 14, line 53, in Claim 11: delete "where "i",".

Column 15, line 2, in Claim 11: after "component" insert a --,--.

Column 15, line 4, in Claim 11: the "$S_{0q}$" should be replaced with --$S_{1q}$--.

Signed and Sealed this

Twenty-third Day of February, 2010

David J. Kappos
*Director of the United States Patent and Trademark Office*